(12) United States Patent
Iwane

(10) Patent No.: US 10,587,798 B2
(45) Date of Patent: Mar. 10, 2020

(54) IMAGE PROCESSING APPARATUS

(71) Applicant: NIKON CORPORATION, Tokyo (JP)

(72) Inventor: Toru Iwane, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/380,802

(22) PCT Filed: Feb. 25, 2013

(86) PCT No.: PCT/JP2013/054819
§ 371 (c)(1),
(2) Date: Aug. 25, 2014

(87) PCT Pub. No.: WO2013/129337
PCT Pub. Date: Sep. 6, 2013

(65) Prior Publication Data
US 2015/0042838 A1    Feb. 12, 2015

(30) Foreign Application Priority Data
Feb. 28, 2012  (JP) .................. 2012-041433

(51) Int. Cl.
*H04N 5/232* (2006.01)
*G06T 3/40* (2006.01)
(Continued)

(52) U.S. Cl.
CPC ....... *H04N 5/23235* (2013.01); *G02B 3/0056* (2013.01); *G02B 26/08* (2013.01);
(Continued)

(58) Field of Classification Search
CPC .......... H04N 5/23235; H04N 5/23212; G02B 3/0056; G02B 26/08; G06T 3/4015; G06T 5/004; G06T 2207/10052
(Continued)

(56) References Cited

U.S. PATENT DOCUMENTS 3,017,515 A      1/1962   Welch et al.
4,301,478 A  *  11/1981   Sakane .............. H04N 5/23212
                                                              348/350
(Continued)

FOREIGN PATENT DOCUMENTS

JP    A-2007-4471      1/2007
JP    A-2008-219878    9/2008
(Continued)

OTHER PUBLICATIONS

Ng, R. et al., "Light Field Photography with a Hand-held Plenoptic Camera," Stanford Tech Report CTSR Feb. 2005, pp. 1-11.
(Continued)

Primary Examiner — Luong T Nguyen
(74) Attorney, Agent, or Firm — Oliff PLC

(57) ABSTRACT

An image processing apparatus includes: a plurality of micro-lenses arranged in a two-dimensional pattern so that a subject light through an image forming optical system enter there; a plurality of light receiving elements disposed in a vicinity of a focal position at rear side of the micro-lenses to correspond to the plurality of micro-lenses respectively that receive the subject light through the micro-lenses; an image synthesizing unit that synthesizes an image on a focal plane that is different from a predetermined focal plane of the image forming optical system based upon outputs from the plurality of light receiving elements; and a processing unit that, based upon at least an objective image in a vicinity of the plurality of micro-lenses, and an auxiliary image outside the vicinity of the plurality of micro-lenses, which are synthesized by the image synthesizing unit, performs a process to enhance a resolution of the objective image.

4 Claims, 9 Drawing Sheets

(51) Int. Cl.
   *G06T 5/00* (2006.01)
   *G02B 3/00* (2006.01)
   *G02B 26/08* (2006.01)

(52) U.S. Cl.
   CPC ............ *G06T 3/4015* (2013.01); *G06T 5/004* (2013.01); *H04N 5/23212* (2013.01); *G06T 2207/10052* (2013.01)

(58) Field of Classification Search
   USPC .......................................................... 348/22
   See application file for complete search history.

(56) References Cited

U.S. PATENT DOCUMENTS

| | | | | |
|---|---|---|---|---|
| 5,358,827 | A * | 10/1994 | Garofalo | G03F 1/29 430/311 |
| 7,732,744 | B2 | 6/2010 | Utagawa | |
| 8,005,314 | B2 * | 8/2011 | Ortyn | G01N 21/6458 359/30 |
| 2005/0062861 | A1 * | 3/2005 | Hamasaki | H04N 5/217 348/241 |
| 2007/0237416 | A1 * | 10/2007 | Taguchi | G06T 3/4007 382/254 |
| 2007/0252047 | A1 | 11/2007 | Pal | |
| 2008/0131019 | A1 | 6/2008 | Ng | |
| 2008/0267601 | A1 * | 10/2008 | Kobayashi | G03B 13/32 396/91 |
| 2009/0140131 | A1 * | 6/2009 | Utagawa | G02B 3/0056 250/226 |
| 2009/0185801 | A1 * | 7/2009 | Georgiev | G03B 15/00 396/332 |
| 2009/0190022 | A1 * | 7/2009 | Ichimura | G02B 3/0056 348/340 |
| 2010/0091133 | A1 * | 4/2010 | Lim | G02B 27/58 348/223.1 |
| 2010/0208104 | A1 * | 8/2010 | Imagawa | H04N 5/2176 348/234 |
| 2011/0064327 | A1 | 3/2011 | Dagher et al. | |
| 2011/0205388 | A1 * | 8/2011 | Iwane | G06T 1/00 348/222.1 |
| 2012/0287331 | A1 | 11/2012 | Iwane | |
| 2015/0009357 | A1 * | 1/2015 | Seibel | A61B 1/07 348/222.1 |

FOREIGN PATENT DOCUMENTS

| | | |
|---|---|---|
| JP | A-2008-294741 | 12/2008 |
| JP | A-2009-105717 | 5/2009 |
| JP | A-2010-114758 | 5/2010 |
| JP | A-2011-253431 | 12/2011 |

OTHER PUBLICATIONS

International Search Report issued in International Application No. PCT/JP2013/054819 dated Apr. 2, 2013 (with translation).
Naoki Asada et al. "Edge and Depth from Focus." International Journal of Computer Vision. 1998. vol. 26. pp. 153-163.
Akira Kubota et al. "Reconstruction Arbitrarily Focused Images From Two Differently Focused Images Using Linear Filters." Ieee Transactions on Image Processing. Nov. 2005. vol. 14 No. 11. pp. 1848-1859.
Aug. 5, 2015 Extended Search Report issued in European Patent Application No. 13 75 5116.4.
May 24, 2016 Office Action issued in Japanese Application No. 2012-041433.
Mar. 21, 2016 Search Report issued in European Patent Application No. 13755116.4.
Feb. 3, 2017 Office Action issued in Chinese Patent Application No. 201380010817.0
Dec. 28, 2018 Office Action issued in Indian Application No. 7183/DELNP/2014.

* cited by examiner (a)

(b)

(a)

(b)

(c)

(a)

(b)

(c)

IMAGE PROCESSING APPARATUS

TECHNICAL FIELD

The present invention relates to an image processing apparatus.

BACKGROUND ART

Image-capturing devices known in the related art are equipped with a plurality of image-capturing pixels disposed in correspondence to each micro-lens, and generate an image assuming any desired focal position following a photographing operation by combining image data having been obtained through the single photographing operation (for example, Patent literatures 1 and 2 and Non-patent literature 1).

CITATION LIST

Patent Literature

Patent literature 1: Japanese Laid Open Patent Publication No. 2007-4471
Patent literature 2: U.S. Laid Open Patent Publication No. 2007/0252047

Non-Patent Literature

Non-Patent literature: "Light Field Photography With a Handheld Plenoptic Camera, Stanford Tech Report CTSR 2005-02"

SUMMARY OF THE INVENTION

Technical Problem

However, when the image assuming the desired focal position including pixels whose quantity is more than a quantity of the arranged micro-lenses is generated, there is a problem that a resolution of the generated image in the vicinity of a vertex of the micro-lens greatly decreases.

Solution to Problem

According to the 1st aspect of the present invention, an image processing apparatus comprises: a plurality of micro-lenses arranged in a two-dimensional pattern so that a subject light passed through an image forming optical system enter there; a plurality of light receiving elements that are disposed in a vicinity of a focal position at rear side of the micro-lenses to correspond to the plurality of micro-lenses respectively and receive the subject light passed through the micro-lenses; an image synthesizing unit that synthesizes an image positioned on a focal plane that is different from a predetermined focal plane of the image forming optical system based upon outputs from the plurality of light receiving elements; and a processing unit that, based upon at least an objective image that is the image in a vicinity of the plurality of micro-lenses, and an auxiliary image that is the image outside the vicinity of the plurality of micro-lenses, which are synthesized by the image synthesizing unit, performs a process to enhance a resolution of the objective image.

According to the 2nd aspect of the present invention, an image processing apparatus comprises: a plurality of micro-lenses arranged in a two-dimensional pattern so that a subject light passed through an image forming optical system enter there; a plurality of light receiving elements that are disposed in a vicinity of a focal position at rear side of the micro-lenses to correspond to the plurality of micro-lenses respectively and receive the subject light passed through the micro-lenses; an image synthesizing unit that synthesizes an image positioned on a focal plane that is different from a predetermined focal plane of the image forming optical system based upon outputs from the plurality of light receiving elements; and a control unit that controls the image synthesizing unit so that an objective image that is the image in a vicinity of vertexes of the plurality of micro-lenses and an auxiliary image that is the image outside the vicinity of the vertexes of the plurality of micro-lenses are added, adds a high frequency component of the auxiliary image to the objective image, and outputs.

According to the 3rd aspect of the present invention, it is preferred that in the image processing apparatus according to the 2nd aspect, the objective image is an image on a focal plane positioned apart not more than or equal to a double of a focal length of the plurality of micro-lenses from the vertexes of the plurality of micro-lenses.

According to the 4th aspect of the present invention, it is preferred that in the image processing apparatus according to the 2nd or 3rd aspect, the objective image is an image on a focal plane positioned apart more than or equal to a double of a focal length of the plurality of micro-lenses from the vertexes of the plurality of micro-lenses.

According to the 5th aspect of the present invention, it is preferred that in the image processing apparatus according to any one of the 2nd through 4th aspects, the control unit controls the image synthesizing unit to synthesize a plurality of auxiliary images corresponding to the focal planes different from each other, adds high frequency components of the plurality of auxiliary images to the objective image, and outputs.

According to the 6th aspect of the present invention, it is preferred that in the image processing apparatus according to the 5th aspect, the control unit controls the image synthesizing unit to synthesize the auxiliary images on focal planes positioned on a front side and a rear side apart a double of the focal length of the plurality of micro-lenses from the vertexes of the plurality of micro-lenses, respectively.

Advantageous Effect of the Invention

According to the present invention, it is possible to synthesize an image with a high resolution even at the focal position in the vicinity of the vertex of the micro-lens.

DESCRIPTION OF EMBODIMENTS (The First Embodiment)

The digital camera achieved in an embodiment of the present invention is capable of generating image data assuming a focus position desired by the user through numerical processing executed by utilizing wavefront information such as depth information included in image signals obtained as an image is photographed via a micro-lens array. An incident subject light flux, having passed through a photographic lens forms an image near the micro-lens array. The position at which the image is formed with the light flux in this manner varies along the optical axis of the photographic lens depending upon the position of the subject. In addition, subject light fluxes from a three-dimensional subject do not form images on a single plane. The digital camera achieved in the embodiment generates (synthesizes or composes) an image that is a reproduction of a subject image formed at a specific image forming position desired by the user, assumed along the optical axis. Hereinafter, the generated image is called an objective image. In the objective image, the focal point is observed as if it exists at the image forming position (not the real image forming position but the position desired by the user). In the following explanation, the image forming position is called a focal position.

In addition, the digital camera in the present embodiment adopts such a structure that generates as the above image a synthetic image with a higher resolution than a resolution matching the quantity of micro-lenses included in the micro-lens array. Namely, a plurality of image-capturing pixels (the light-receiving pixels), which output image signals to be used for generation of individual pixels constituting the synthetic image, are disposed in correspondence to each micro-lens. The digital camera generates a synthetic image signal corresponding to an image forming area equivalent to a single pixel in the synthetic image by using not only one image signal output from one image-capturing pixel corresponding to one micro-lens but also image signals output from image-capturing pixels corresponding to micro-lenses disposed near the one micro-lens, and creates the synthetic image with an adjustable focal position so as to provide the synthetic image assuming a focal position selected by the user. The following is a detailed description of the embodiment.

Figure 1:
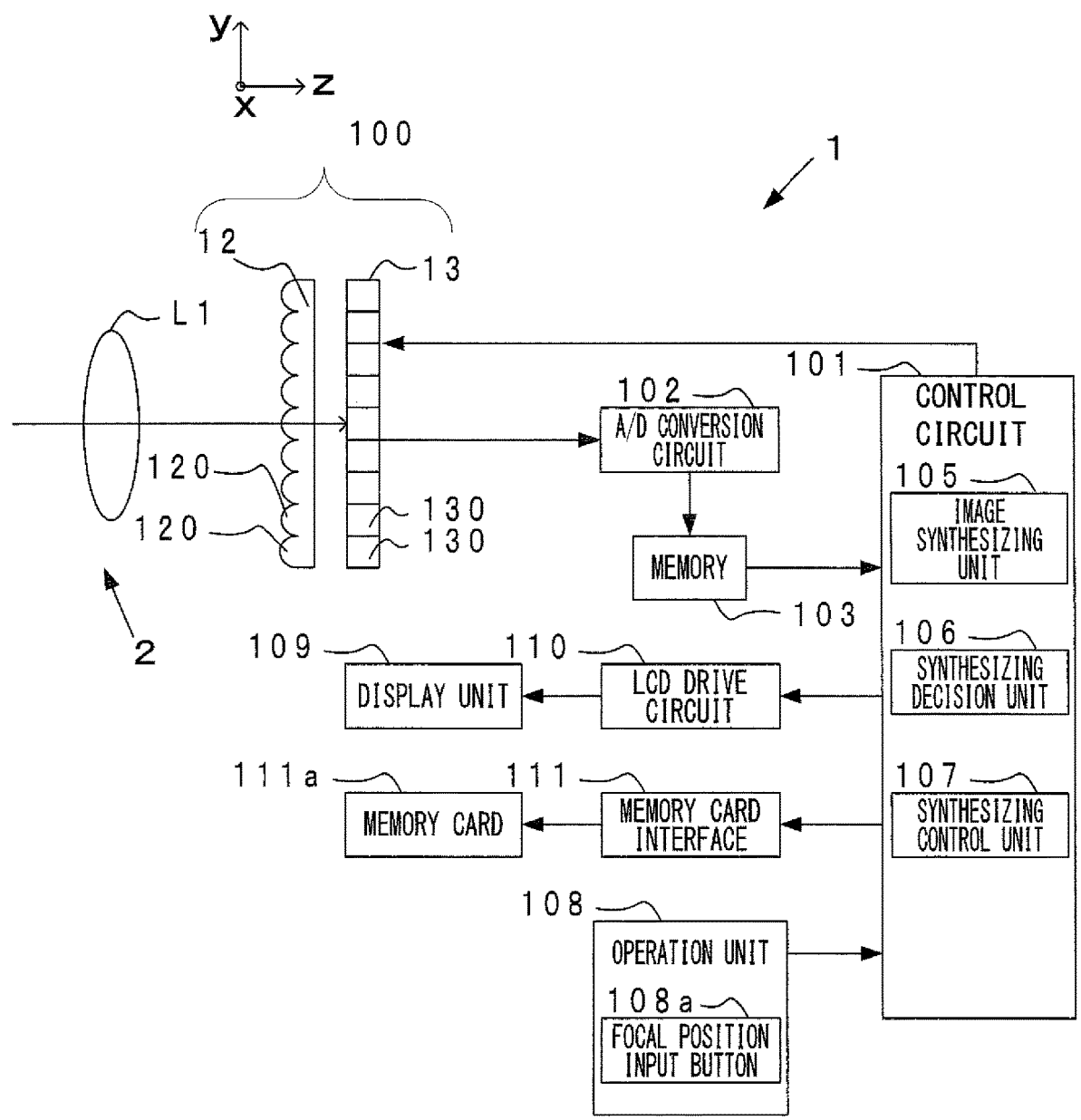
FIG. 1 A block diagram shows the structure adopted in the digital camera achieved in the first embodiment.

FIG. 1 shows the structure adopted in the digital camera achieved in the embodiment. The digital camera 1 allows an interchangeable lens 2, which includes a photographic lens L1, to be detachably mounted thereat via lens mount mechanism such as bayonet mechanism. The digital camera 1 includes an image-capturing unit 100, a control circuit 101, an A/D conversion circuit 102, a memory 103, an operation unit 108, a display unit 109, an LCD drive circuit 110 and a memory card interface 111. The image-capturing unit 100 includes a micro-lens array 12 achieved by disposing numerous micro-lenses 120 in a two-dimensional array, and an image sensor 13. It is to be noted that the following description is given by assuming that a z-axis extends parallel to the optical axis of the photographic lens L1 and that an x-axis and a y-axis extend perpendicular to each other within a plane ranging perpendicular to the z-axis.

The photographic lens L1 is constituted with a plurality of optical lens groups and forms an image with a light flux traveling from a subject at a position near the focal plane of the photographic lens L1. It is to be noted that FIG. 1 shows the photographic lens L1 as a single representative lens for purposes of simplification. The micro-lens array 12 and the image sensor 13 are disposed in this order in the vicinity of the focal plane of the photographic lens L1. The image sensor 13 is constituted with a CCD image sensor or a CMOS image sensor, equipped with a plurality of photoelectric conversion elements. The image sensor 13 captures a subject image formed on its image-capturing surface and outputs photoelectric conversion signals (image signals) that correspond to the subject image, to the A/D conversion circuit 102 under control executed by the control circuit 101. It is to be noted that the image-capturing unit 100 will be described in detail later.

The A/D conversion circuit 102 executes analog processing on the image signals output by the image sensor 13 and then converts the analog image signals to digital image signals. The control circuit 101 is constituted with a CPU, a memory and other peripheral circuits. Based upon a control program, the control circuit 101 executes specific arithmetic operations by using signals input thereto from various units constituting the digital camera 1 and then outputs control signals for the individual units in the digital camera 1 so as to control photographing operations. In addition, the control circuit 101 further determines a focal position of an objective image based upon an operation signal input thereto via the operation unit 108 in response to an operation of a focal position input button 108a, as described in further detail later.

The control circuit 101 has functions fulfilled by an image synthesizing unit 105, a synthesizing decision unit 106 and a synthesizing control unit 107. The image synthesizing unit 105 synthesizes an image on an arbitral optional focal plane that is different from the predetermined focal plane of the photographic lens L1. The synthesizing decision unit 106 decides whether or not the focal position input via the operation unit 108 exists within a predetermined range (described in later) in which the resolving power of the synthetic image decreases. The synthesizing control unit 107 controls the image synthesizing unit 105 based upon the decision results of the synthesizing decision unit 106 to generate the synthetic image, and outputs a final image. It is to be noted that the image synthesizing unit 105, the synthesizing decision unit 106 and the synthesizing control unit 107 will all be described in detail later.

The memory 103 is a volatile storage medium used to temporarily store the image signals having been digitized via the A/D conversion circuit 102, data currently undergoing image processing, image compression processing or display image data creation processing, and data resulting from the image processing, the image compression processing or the display image data creation processing. At the memory card interface 111, a memory card 111a can be detachably loaded. The memory card interface 111 is an interface circuit that writes image data into the memory card 111a and reads out image data recorded in the memory card 111a as controlled by the control circuit 101. The memory card 111a is a semiconductor memory card such as a Compact Flash (registered trademark) or an SD card.

The LCD drive circuit 110 drives the display unit 109 as instructed by the control circuit 101. At the display unit 109, which may be, for instance, a liquid crystal display unit, display data created by the control circuit 101 based upon image data recorded in the memory card 111a are displayed in a reproduction mode. In addition, a menu screen that allows various operation settings to be selected for the digital camera 1 is brought up on display at the display unit 109.

Upon sensing a user operation performed thereat, the operation unit 108 outputs a specific operation signal corresponding to the user operation to the control circuit 101. The operation unit 108 includes the focal position input button 108a, a power button, a shutter release button, buttons related to setting menus, such as a setting menu display changeover button and a setting menu OK button and the like. The user, wishing to enter a focal position "y" of a specific synthetic image, operates the focal position input button 108a. As the user operates the focal position input button 108a and a specific focal position "y" is thus selected, the operation unit 108 outputs a corresponding operation signal including the focal position "y" to the control circuit 101.

Figure 2:
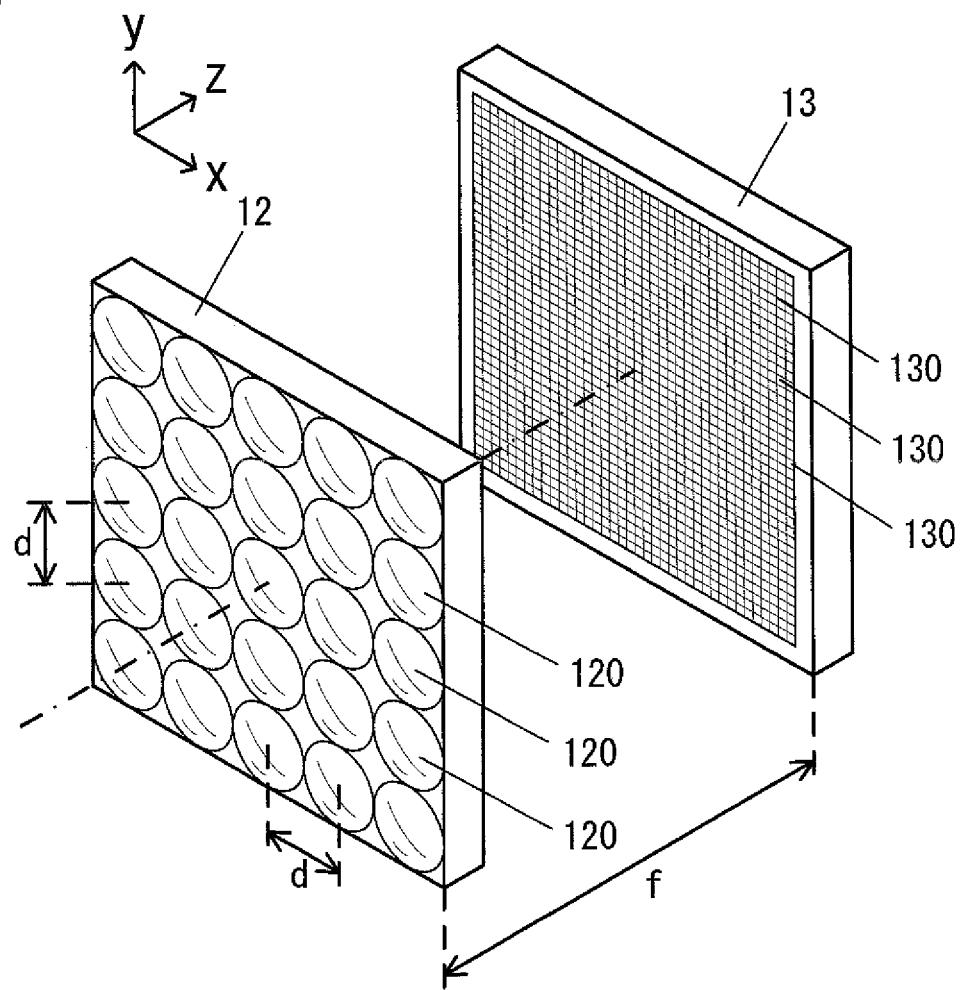
FIG. 2 A diagram shows a perspective view of an image-capturing unit 100.

Next, the structure of the image-capturing unit 100 is described in detail in the reference of the FIG. 2 showing a perspective view of the image-capturing unit 100. The image-capturing unit 100 comprises the micro-lens array 12 and the image sensor 13. The micro-lens array 12 is constituted with a plurality of micro-lenses 120 disposed squarely in a two-dimensional pattern on the xy-plane. At the image sensor 13, photoelectric conversion elements 130 (hereafter referred to as image-capturing pixels 130) that receive light having passed through each of the micro-lenses 120, are disposed with an array pattern corresponding to the array pattern of the micro-lenses 120. The image sensor 13 is disposed at a position set apart in the focal length "f" of the micro-lens 120 from the micro-lens array 12. In other words, in each micro-lens 120, the plurality of image-capturing pixels 130 corresponding to the micro-lens 120 is disposed at a position set apart in the focal length "f" of the micro-lens 120 from the corresponding micro-lens 120.

It is to be noted that FIG. 2 only shows some of the micro-lenses 120 among the plurality of micro-lenses 120 disposed at the micro-lens array 12 and only some of the plurality of image-capturing pixels 130 disposed at the image sensor 13. In fact, there exist more the micro-lenses 120 and more the image-capturing pixels 130. For example, about 100 image-capturing pixels 130 are covered with one micro-lens 120 and thus the micro-lens array 12 includes the micro-lenses 120 whose quantity is about 1/100 of quantity of the image-capturing pixels 130 included in the image sensor 13.

For example, assuming that the focal length of the photographic lens L1 is 50 millimeter, since the focal length "f" of the micro-lens 120 is about several hundred micrometer (about 1/100 of the focal length of the photographic lens L1), a position of the exit pupil of the photographic lens L1, viewed from the image sensor 13, is able to regard as substantially infinite for the micro-lens 120. In other words, the position of the exit pupil of the photographic lens L1 and the image-capturing surface of the image sensor 13 is regarded as optically conjugate.

It is to be noted that the F value of the micro-lens 120 and the F value of the photographic lens L1 are the same. In this case, a total area of the exit pupil of the photographic lens L1 is projected to a total area of the image-capturing pixels 130 covered with the micro-lenses 120. The distribution of light strength of the image divided by the micro-lenses 120 at the position of the exit pupil of the photographic lens L1 appears on the image-capturing surface of the image sensor 13 configured above.

The control circuit 101 of the present embodiment generates two sets of synthetic image data regarding images formed at the front and rear positions (+2f, −2f) that are about double of the focal length "f" of the micro-lens 120, and storage the two sets of the synthetic image data into memory 103. Hereinafter, an image synthesize principle performed in a real space will be explained. It is to be noted that the image synthesize may be performed in the Fourier space where the image signal output from the image sensor 13 is transformed by the Fourier transformation.

Figure 3:
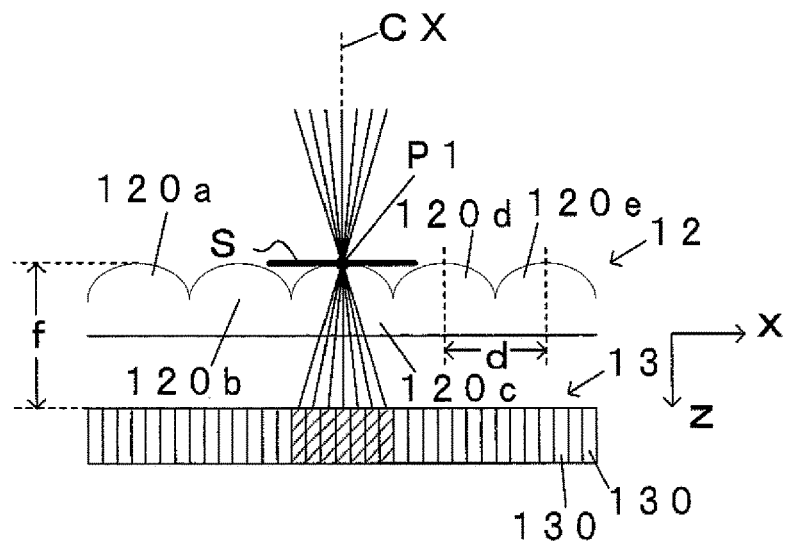
FIG. 3 A diagram shows schematically a cross-sectional view of a micro-lens array 12 and image sensor 13.
Figure 3:
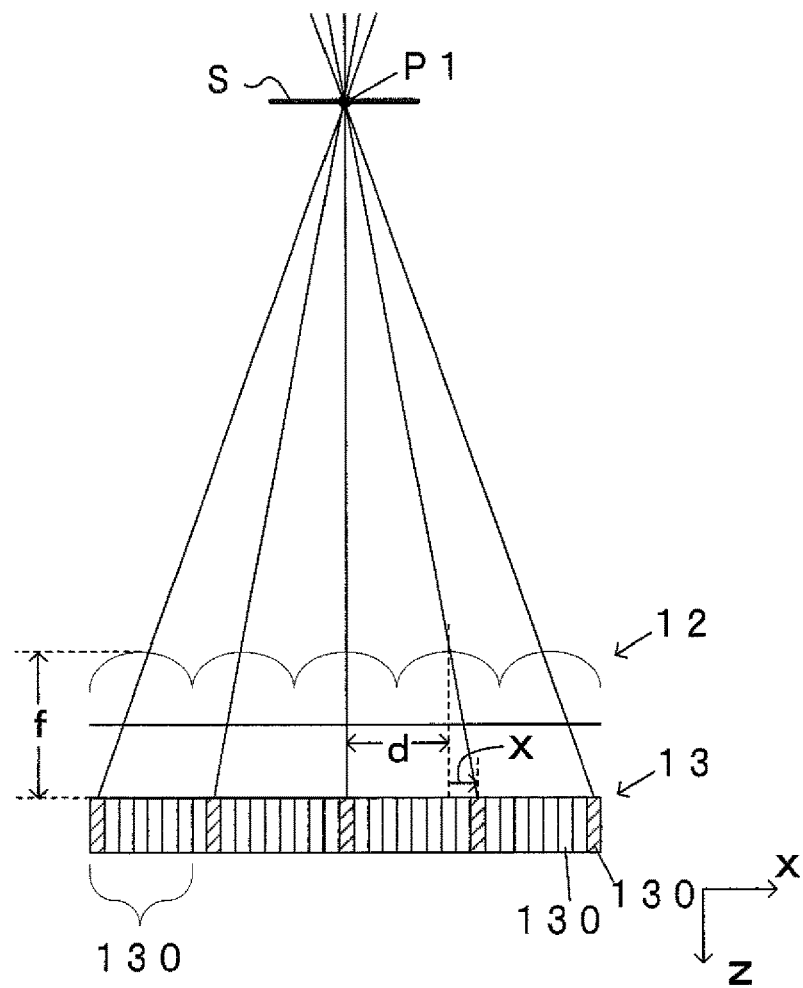

First, the synthetic image generation principle that synthesizes one pixel par each of the micro-lenses 120 is described. FIG. 3 schematically shows a cross section of the micro-lens array 12 and the image sensor 13. In the following explanation, the micro-lens 120c disposed at the center of the micro-lenses 120a-120e, and a synthetic pixel "Px" on the central axis CX of the micro-lens 120c among the synthetic pixels on the imaging plane S at the predetermined position are considered. FIG. 3(a) shows the imaging plane S of a synthetic object that is positioned in the vicinity of the vertex of the micro-lens 120c. Clearly shown in FIG. 3(a), if the imaging plane S of the synthetic object is positioned at closer than the focal length "f" of the micro-lens 120c, the light flux included in the synthetic pixel "Px" passes through only the micro-lens 120c, but does not reach the other micro-lenses 120a, 120b, 120d and 120e.

On the other hand, shown in FIG. 3(b), if the imaging plane S of the synthetic object positioned apart from the vicinity of the vertex of the micro-lens 120c more than the focal length "f", the light flux included in the synthetic pixel "Px" enters into the plurality of micro-lenses. As shown in FIG. 3(b), assuming that the focal length of the micro-lenses 120a-120e sets "f", a pitch of each of the micro-lenses 120a-120e sets "d", a distance from the imaging plane of the synthetic object to the vertex of each of the micro-lenses 120a-120e sets "y", and a position on the image sensor 13, into which the light flux passed through a specific micro-lens is to enter, representing a distance from the center of the specified micro-lens sets "x", the above values have a proportion relation indicated by the following equation (1).

$$y/(nd)=f/x \tag{1}$$

The value "n" is dimensionless number indicating how apart the micro-lenses into which the light flux is to enter are disposed from the micro-lens 120c corresponding to the synthetic pixel "Px", and n=1 indicates that they are the micro-lenses 120b and 120d next to the micro-lens 120c. Since the focal length "f" and the pitch "d" of the micro-lens 120c are constant in the above equation (1), it is decided into which of the micro-lenses the light flux from the synthetic pixel "Px" is to enter under the condition that the focal position "y" and the distance "x" from the center of the micro-lens are set. Since "n" is an integer and thus discrete value, "n" is an integer portion of yx/(fd). The synthetic pixel positioned on the central axis CX of the micro-lens 120c and apart in the distance "y" from the vertex of the micro-lens 120c is generated by integrating the outputs from the image-capturing pixels 130 disposed at the position satisfying the above equation (1). In other words, if intensity of light (the output from the image-capturing pixel 130) at the distance "x" sets I(x), a pixel value P of the synthetic pixel "Px" can be calculated by the following equation (2).

[Math. 1]

$$P = \int_{-d/2}^{d/2} I(x)dx = \sum_{x=-d/2}^{d/2} I(x) \quad (2)$$

It is to be noted that "x" of the above equation (2) is a value in a range corresponding to the plurality of micro-lenses, and which micro-lens each value belong to depends on the above equation (1).

Figure 4:
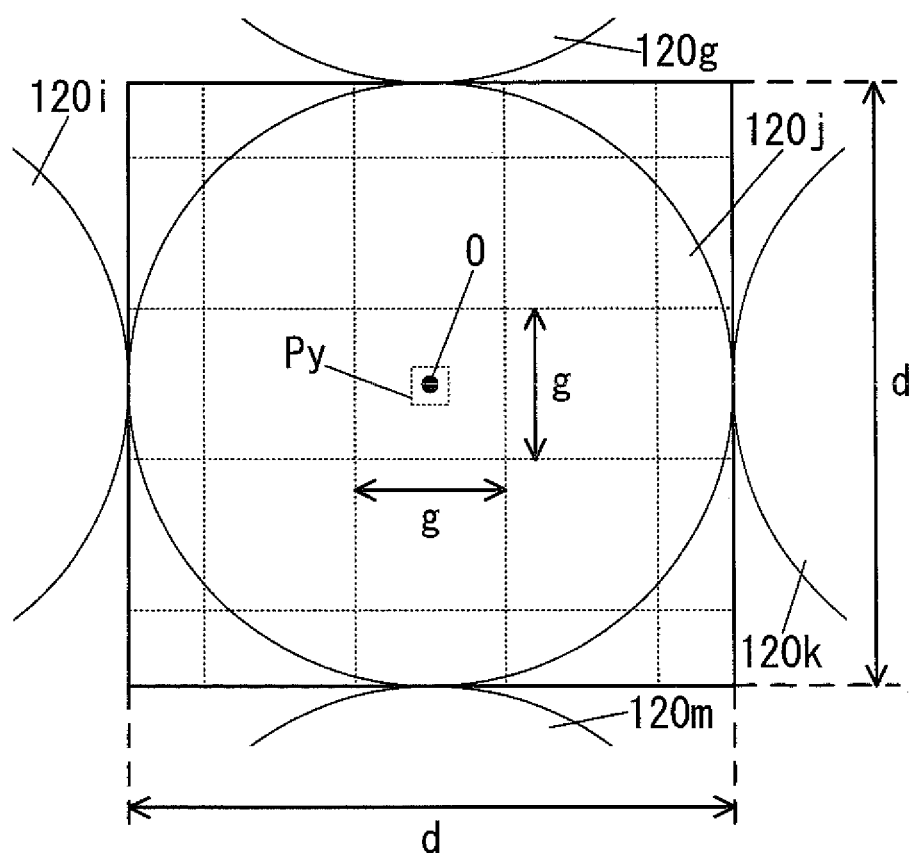
FIG. 4 A schematic diagram shows the micro-lens array 12 viewed from entering side of subject light.

Then, the concept described above is expanded to two dimensions. FIG. 4 schematically shows the micro-lens array 12 from the entering side of the subject light. In the following explanation, a grid 122 that divides the micro-lens 120$j$ as shown in FIG. 4 is considered. A pitch "g" of the grid 122 is depends on the position of the image to be synthesized (focal position "y"). For example, assuming that the focal position "y" is the quadruple of the focal length "f" of the micro-lens 120, the pitch "g" of the grid 122 become, as shown in FIG. 4, ¼ of the pitch "d" between the micro-lenses 120.

The grid 122 indicates that one synthetic pixel "Py" corresponding to a center O of the micro-lens 120$j$ is synthesized by integrating the outputs from which of the image-capturing pixels 130 output. In the following this point will be explained in reference of FIG. 5. The grid 122 consists of twenty-five rectangular sections totally. This indicates that the synthetic pixel "Px" is synthesized by integrating the outputs from the image-capturing pixels 130 corresponding to each of twenty-five sections.

The position of each section within the grid 122 (relative position from the center O) indicates which of the micro-lenses 120 corresponds to the section if the micro-lens 120$j$ is regarded as a center and which of the image-capturing pixels 130 covered by its micro-lens corresponds to the section. Hereinafter, this point will be explained in reference of FIG. 5($a$). The left side of FIG. 5($a$) shows the magnified micro-lens 120$j$ and the right side of FIG. 5($b$) shows the micro-lenses disposed around the micro-lens 120$j$ as the center. The section 140$j$ corresponds to the image-capturing pixel 130$j$ in the range corresponding to the section 140$j$ within the grid 122 among the image-capturing pixels 130 covered with the micro-lens 120$j$.

Figure 5:
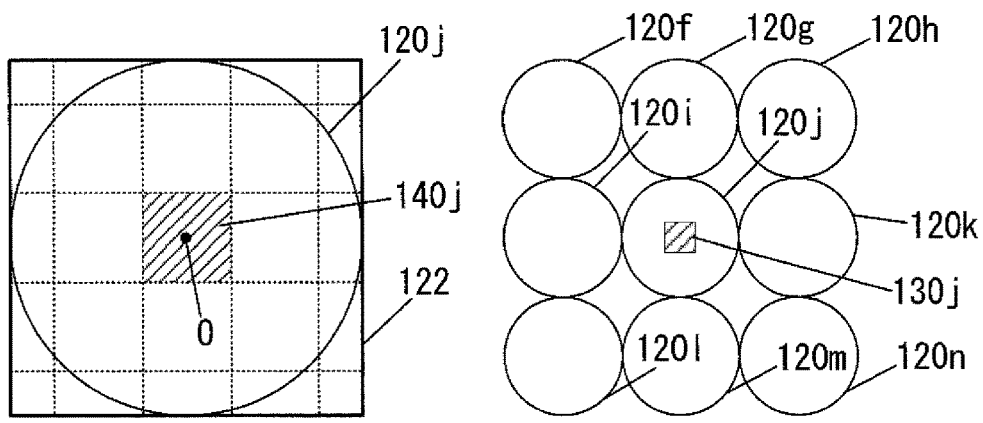
FIG. 5 A diagram shows the image-capturing pixel 130 the output of which is to be integrated so as to synthesize the synthetic pixel "Py".
Figure 5:
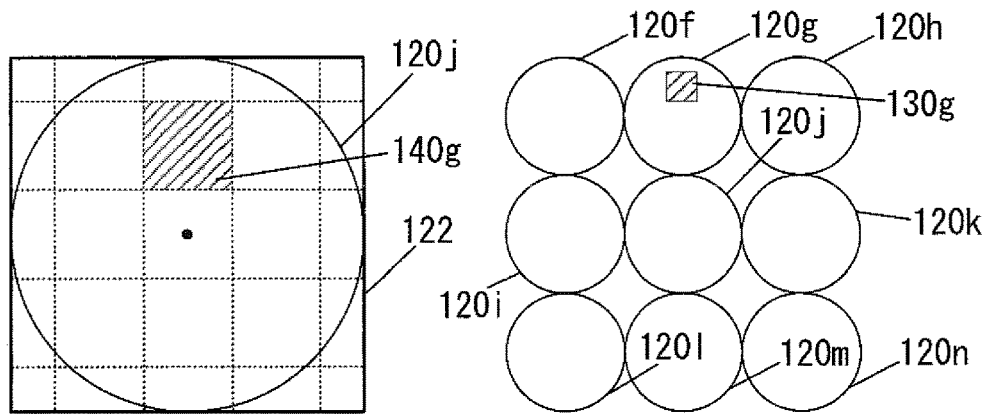
Figure 5:
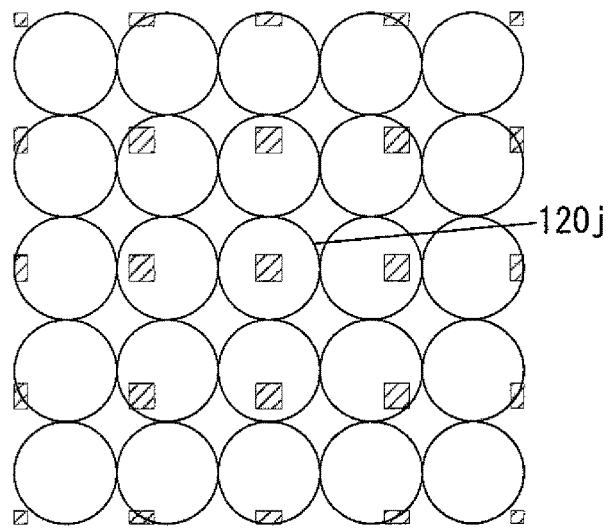

On the other hand, as shown in FIG. 5($b$), the section 140$g$ next to upper side of the section 140$j$ corresponds to the image-capturing pixel 130$g$ in the range corresponding to the section 140$g$ within the grid 122 among the image-capturing pixels 130 covered with the micro-lens 120$g$ next to upper side of the micro-lens 120$j$. One synthetic pixel corresponding to the center O of the micro-lens 120$j$ is generated by integrating the outputs from the image-capturing pixels 130 within the range specified by twenty-five sections. FIG. 5($c$) shows the range specified by twenty-five sections. As explained above, if the focal position "y" is the quadruple of the focal length "f" of the micro-lens 120, one synthetic pixel corresponding to the center O of the micro-lens 120$j$ is synthesized by integrating the outputs from the image-capturing pixels 130 covered with the micro-lens 120$j$ and the twenty-four micro-lenses 120 disposed around the micro-lens 120$j$, and the positions of the specific image-capturing pixels 130 are shown in FIG. 5($c$).

In summary, assuming that N image-capturing pixels 130 covered with the micro-lens 120 exist, positions of these image-capturing pixels 130 within the micro-lens 120 is represented by i and j on a coordinate with the origin being the center of the micro-lens 120, and which of the nearby micro-lens 120 the image-capturing pixel 130 coordinated on i and j belongs to (corresponds to) is represented on a coordinate by p and q, the integration of synthesizing N synthetic pixels with n=1–N is represented by the following equations (3)-(7).

[Math. 2]

$$i = \phi x(n) \quad (3)$$

$$j = \phi y(n) \quad (4)$$

$$p = \eta x(i, j) \quad (5)$$

$$q = \eta y(i, j) \quad (6)$$

$$P_{xy} = \sum_{k=1}^{N} I(\phi x(n), \phi y(n), x + \eta x(\phi x(n), \phi y(n)), y + \eta y(\phi x(n), \phi y(n))) \quad (7)$$

Figure 6:
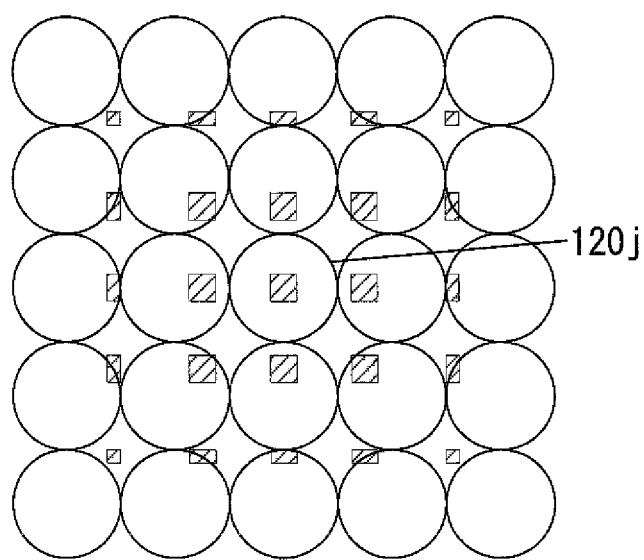
FIG. 6 A diagram shows the image-capturing pixel 130 the output of which is to be integrated so as to synthesize the synthetic pixel "Py".

The functions η$x$ and η$y$ in the equations (5) and (6) depend on a division on the image-capturing surface of the image sensor 13 divided by the above explained grid 122. The larger the focal position "y" is set apart from the vertex of the micro-lens 120, the smaller the pitch "g" of the grid 122 becomes, and when the focal length "f" of the micro-lens 120 and the focal position "y" coincide with each other, the pitch "g" coincides with the pitch "d" of the micro-lens 120. It is to be noted that an integration pattern of the image-capturing pixels 130 is shown in FIG. 6 under the condition of the focal position y=−4f.

The above explanation is the synthetic image generation principle to synthesize one pixel par each of the micro-lenses 120. By the above explained process the synthetic pixel at the position corresponding to the center of the micro-lens 120, but since only the pixels whose quantity matching the quantity of the micro-lenses 120 are synthesized, the resolution of the synthetic image becomes equal to number of the micro-lenses 120. For example, if quantity of the image-capturing pixels 130 covered with the micro-lens 120 is 100, the resolving power of the synthetic image becomes 1/100 of original resolving power of the image sensor 13. If the image sensor 13 includes 10,000,000 pixels, the synthetic image includes 100,000 pixels and thus it is not possible to obtain enough resolving power.

In the present embodiment, the pixel of the synthetic image is set at the position other than the center of the micro-lens 120 and the integration pattern of the image-capturing pixels 130 is generated so as to synthesize the pixels. The image synthesizing unit 150 synthesizes the plurality of pixels par one micro-lens 120 by integrating the outputs from the image-capturing pixels 130 in accordance with the integration pattern. In the following this synthetic method will be explained. As described above, the pitch "g" of the grid 122 (magnification of the grid dividing the area covered with the micro-lens 120) indicates (corresponds to) the focal position "y". Namely, the position along the optical axis of the synthetic pixel corresponds to the pitch "g" of the grid 122. On the other hand, the position along perpendicular to the optical axis, so to speak, corresponds to a phase of the grid 122 and thus it is possible to synthesize the synthetic pixel at the position other than the center of the micro-lens 120 by altering a reference position of the grid 122.

The following explanation is, for example, the method dividing the micro-lens 120 into 16 areas with 4×4 and synthesizing the pixels corresponding to each areas. In other words, instead of synthesizing the synthetic pixel corresponding to the center of the micro-lens 120, the method synthesizing the synthetic pixel corresponding to a center of the area for each of the sixteen areas will be explained.

Figure 7:
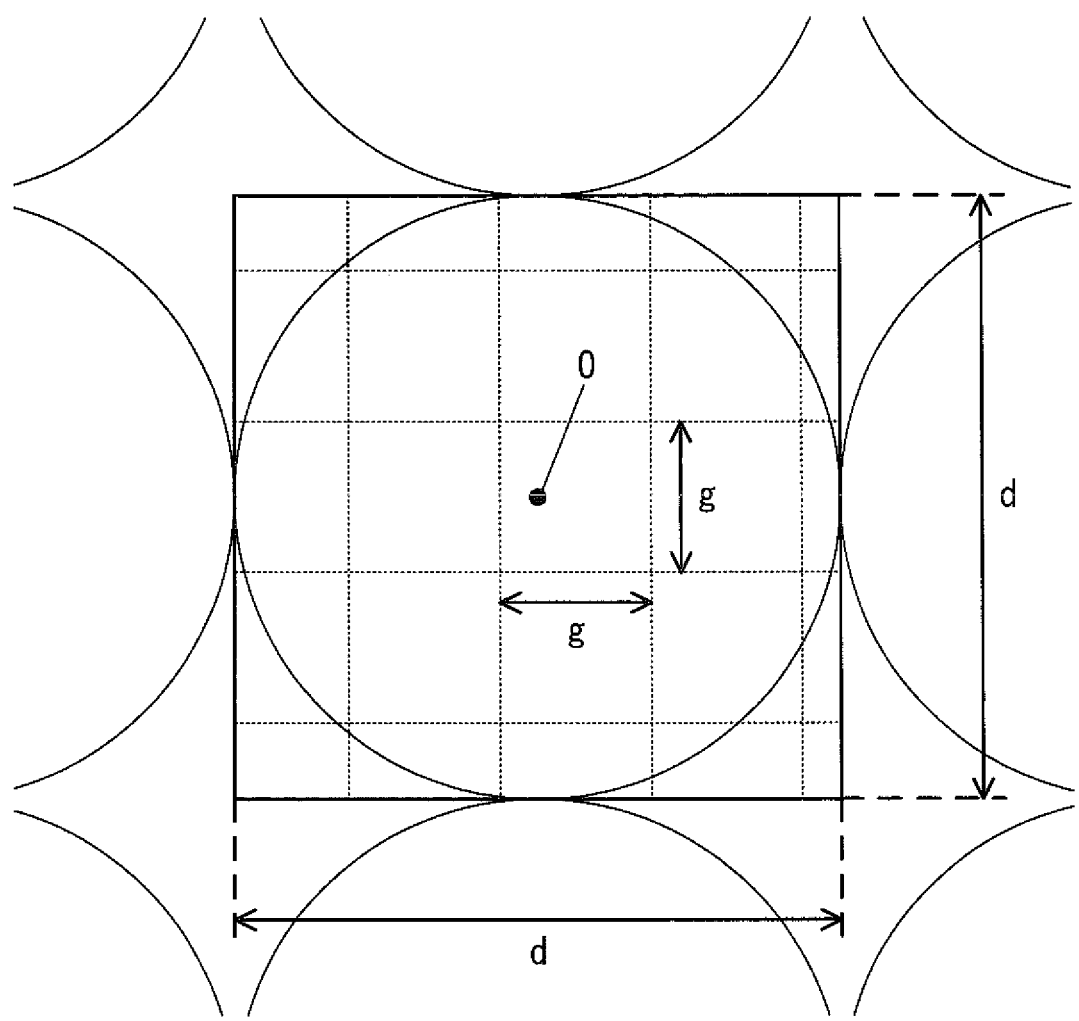
FIG. 7 A diagram shows a grid 122 is shifted rightward in ¼ of pitch "g".
Figure 8:
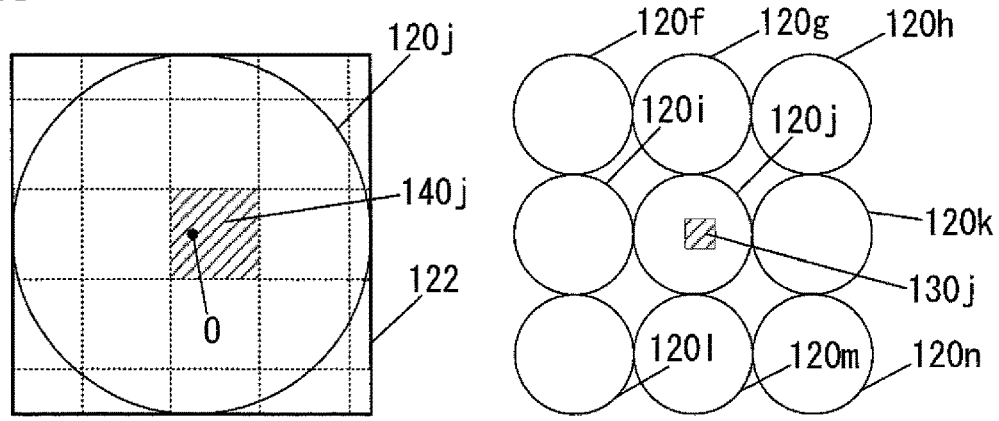
FIG. 8 A diagram shows an integration pattern of the image-capturing pixels 130 when the grid 122 is shifted rightward in ¼ of pitch "g".
Figure 8:
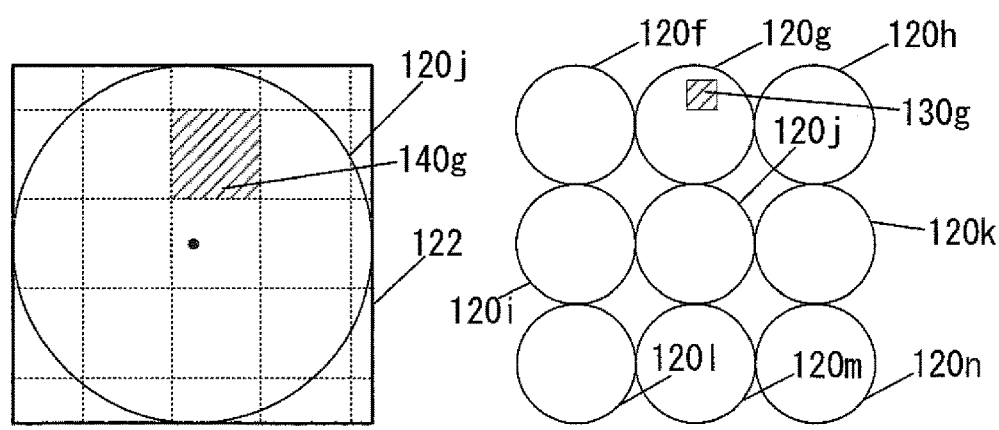
Figure 8:
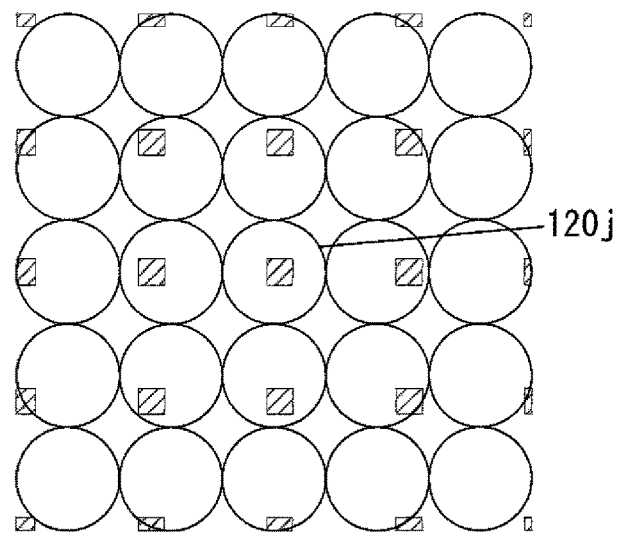

FIG. 7 is a diagram indicating that the grid 122 is shifted to rightward ¼ of the pitch "g". FIGS. 8(*a*)-8(*c*) show the integration pattern gained by the same manner shown in FIGS. 5(*a*)-5(*c*) under the grid 122 shifted. It is possible to synthesize the synthetic pixel at the position shifted to rightward ¼ of the pitch "g" from the center O of the micro-lens 120 by integrating the outputs from each of the image-capturing pixels 130 shown in FIG. 8(*c*). By the same manner it is possible to synthesize the synthetic pixels at sixteen points within the micro-lens 120 by obtaining the integration patterns shifting the grid 122 to upward, downward, rightward and leftward ¼ of the pitch "g". Namely, in principle it is possible to obtain the synthetic image including pixels whose quantity is sixteen times of quantity of micro-lenses 120.

By the way, when synthesizing the plurality of pixels for each of the micro-lenses 120 by using the above described method, it may happen that the enough resolving power cannot be obtained on the condition of the focal position "y". Concretely explained, on the condition that the focal length of the micro-lens 120 is "f", with the focal position "y" being in the range from +2f to −2f, the resolving power decreases in comparison with the focal position "y" setting outside of that range. This is because a variation of the above described integration patterns of the image-capturing pixels 130 decreases and several of them indicate the same pattern if the focal position "y" is set at the above range.

Namely, for example, when the sixteen synthetic pixels are to be synthesized for one micro-lens 120 as described above, several of those synthetic pixels become the same outputs under the condition of the focal position "y" being set in the range from +2f to −2f. The closer the focal position "f" is to the vertex of the micro-lens 120, the more resolving power reduces, and especially, when the focal position "y" is positioned exactly at the vertex of the micro-lens 120 (the focal position y=0), quantity of the pixels (resolving power) of the objective image becomes equal to quantity of the micro-lenses 120. In other words, when the sixteen synthetic pixels are synthesized for one micro-lens 120 as described above, all of the sixteen synthetic pixels become the same.

Then, the digital camera of the present embodiment synthesizes, in addition to the objective image, an image on the focal plane other than the focal position "y" that is set (hereafter referred to as auxiliary image) if the focal position set by the user is positioned within the range from −2f to +2f, so as to raise the resolving power of the objective image by using this auxiliary image. The following is the explanation of the image synthesizing process by the digital camera of the present embodiment.

Figure 9:
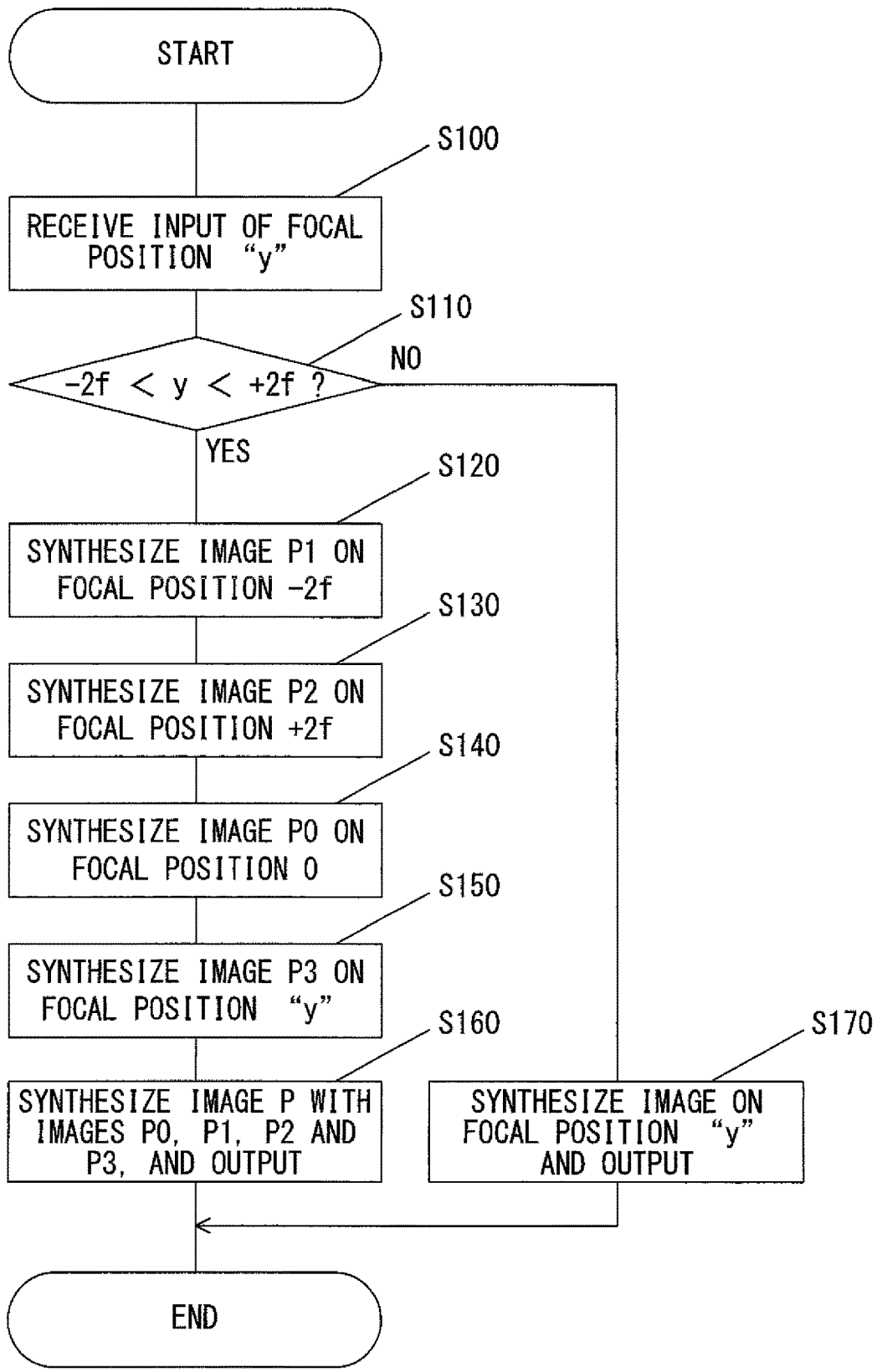
FIG. 9 A flow chart indicates an image synthesizing process.

FIG. 9 shows a flow chart of the image synthesizing process. The control circuit 101 performs the image synthesizing process by executing a predetermined program. First, in a step S100, the synthesizing control unit 107 receives the focal position "y" that is input from the operation unit 108. In a step S110, the synthesizing decision unit 106 decides whether or not the input focal position "y" is within from −2f to +2f. If the input focal position "y" is out of this range, the process proceeds to a step S170 and the synthesizing control unit 107 controls the image synthesizing unit 105 to perform the image synthesize by the ordinary manner described above (image synthesizing that synthesizes the plurality of pixels for one micro-lens 120) and outputs the objective image. For example, the control circuit 101 stores the objective image output by the synthesizing control unit 107 in the step S170 into the memory card 111a, or displays the objective image on the display 109. On the other hand, if the input focal position "y" is decided to be within from −2f to +2f, the process proceeds to a step S120.

In the step S120, the synthesizing control unit 107 controls the image synthesizing unit 105 to synthesize the image with the focal position being −2f (first auxiliary image). Hereinafter, the auxiliary image equivalent of the position −2f synthesized in the step S120 is referred to as P1. In a following step S130, as the same manner performed in the step S120, the synthesizing control unit 107 controls the image synthesizing unit 105 to synthesize the image with the focal position being +2f (second auxiliary image). Hereinafter, the auxiliary image equivalent of the position +2f synthesized in the step S130 is referred to as P2. Each of the auxiliary images P1 and P2 are memorized in the memory 103.

In a step S140, the synthesizing control unit 107 controls the image synthesizing unit 105 to synthesize the image positioned at the vertex of the micro-lens 120 (that is the auxiliary image at focal position y=0) and to memorize it in the memory 103. Hereinafter, the third auxiliary image is referred to as P0. The auxiliary image P0 is an image that does not possess, as described above, the resolving power more than quantity of the micro-lens 120 and that consists of low spatial frequency. In a step S150, the synthesizing control unit 107 controls the image synthesizing unit 105 to perform the ordinary image synthesizing based upon the focal position "y" input from the operation unit 108 in the step S100. Hereinafter, the objective image synthesized in the step S150 is referred to as P3. Since the objective image P3 is the synthetic image on the imaging plane (focal plane) positioned within from −2f to +2f, a certain amount of the resolving power is lost in the objective image P3 as described above.

In a step S160, the synthesizing control unit 107 performs a calculation indicated by the following equation (8) for each pixel of the objective image P3 synthesized in the step S150, generates a final objective image P and output it.

[Math. 3]

$$P(i,\ j) = \left(\left(\frac{y+2f}{4f}\right)P_1(i,\ j) + \left(\frac{2f-y}{4f}\right)P_2(i,\ j) - P_0(i,\ j)\right) + P_3(i,\ j) \quad (8)$$

In the above equation (8), P0(i, j) represents the synthesized pixel on the coordinate (i, j) of the auxiliary image P0. P1(i, j), P2(i, j) and P3(i, j) represent the synthesized pixels on the coordinate (i, j) of the auxiliary images P1, P2 and P3, respectively. The first term in a right hand of the above equation (8) represents a high frequency component of the spatial frequency obtained from the auxiliary images positioned at −2f and +2f, which is added by the synthesizing control unit 107 to the objective image P3 in which the certain resolving power is lost so as to generate the final objective image P3 (to enhance the resolving power in the objective image P3).

According to the digital camera of the first embodiment explained above, the following beneficial effects are obtained.

(1) The digital camera 1 includes the plurality of micro-lenses 120 arranged in the two dimensional configuration so as to enter subject light passed through the photographic lens L1 therein, and the plurality of image-capturing pixels 130 that is arranged in correspondence with each of the plurality of micro-lenses 120 in the vicinity of focal position on rear side of the micro-lens 120 and receive subject light passed through the micro-lens 120. The image synthesizing unit 105 is configured to be able to synthesize the image on the focal plane that is different from the predetermined focal plane of the photographic lens L1 based upon the outputs from the plurality of image-capturing pixels 130. The synthesizing control unit 107 controls the image synthesizing unit 105 so that the objective image positioned on the focal plane in the vicinity of the vertexes of the plurality of micro-lenses 120 and the auxiliary image positioned on the focal plane other than in the vicinity of the vertex of the plurality of micro-lenses 120 are synthesized, adds the high frequency component of the auxiliary image to the objective image and outputs it. Therefore, it is possible to synthesize the image with the high resolution even at a focal position that leads a decrease of resolving power on the synthetic image.

(2) If the input position is not apart from the vertexes of the plurality of micro-lenses 120 more than or equal to double of the focal length "f" of the plurality of micro-lenses 120, the synthesizing control unit 107 adds the high frequency component to the objective image P3. ue to this, it is possible to synthesize the high resolution image on the arbitrary focal position.

(3) The images on the focal plane positioned apart from the vertexes of the plurality of micro-lenses 120 more than or equal to double of the focal length "f" of the plurality of micro-lenses 120 are defined as the auxiliary images P2 and P1. Accordingly, the auxiliary images P2 and P1 include for sure the high frequency component and thus it is possible to add the high frequency component to the objective image P3 with certainty.

(4) The synthesizing control unit 107 make the image synthesizing unit 105 synthesize the plurality of auxiliary images P1 and P2 corresponding to the focal planes different from each other (each of the focal planes positioned on front side and rear side apart double of the focal length "f" of the plurality of micro-lenses 120 from the vertex of the plurality of micro-lenses 120), add the high frequency component of the plurality of auxiliary images P1 and P2 to the objective image P3 and output it. Therefore, it is possible to add the high frequency component with high accuracy.

The following variations are also within the scope of present invention, and it is possible to combine one of the variations or a plurality of variations with the above embodiment.

(Variation 1)

The synthetic image positioned with the focal position "y" being exactly −2f or +2f in the above equation (8) has great difference in the spatial frequency in comparison with the synthetic image positioned at front side or rear side. Therefore, for example, in case of synthesizing and displaying the synthetic image for many focal positions "y" set within a wide range with a predetermined interval, the resolving power changes immediately at the above two points, which make the observer feel a sense of discomfort. In order to soften such a change of resolving power, the image synthesizing may be performed by the following equation (9) that is obtained by modifying the equation (8).

[Math. 4]

$$P(i, j) = \left(1 - \left|\frac{y}{2f}\right|\right) \left(\left(\frac{y+2f}{4f}\right)P_1(i, j) + \left(\frac{2f-y}{4f}\right)P_2(i, j) - P_0(i, j)\right) + P_3(i, j) \quad (9)$$

Even though the focal position "y" of the displaying synthetic image is changed from +2f to +2f−ε, the modifying the equation (8) described above prevents the resolving power of the image from changing immediately. Accordingly, it is possible to change the focal position "y" without the observer feeling a sense of discomfort.

(Variation 2)

When the image synthesizing is performed in real time in accordance with the input of the focal position "y" and the display of the synthetic image and the like is performed, a column of discrete focal positions within the range of all the focal positions that are beforehand assumed may have been decided and the image synthesizing may be in advance performed for these. For example, assuming that the range of the focal position "y" is set ±6 millimeter and the focal length "f" of the micro-lens 120 is set 300 micrometer, the image synthesizing is preliminarily performed for 41 points of −20f, −19f, ..., −f, 0, f, 2f, ..., 20f, and stored into the memory 103. Therefore, it is possible to reduce the burden for processing by the control circuit 101 while displaying the synthetic image.

(Variation 3)

In the first embodiment, the high frequency components extracted from two auxiliary images P1 and P2 are added to the objective image P3 in order to enhance the resolving power of the objective image P3. The present invention is not limited to such an embodiment. For example, when the configuration is adapted to extract the high frequency component from only the auxiliary image P1 and to add it to the objective image P3, it is possible to enhance the resolution power of the objective image P3. Moreover, though the auxiliary image P0 that includes only the low frequency component is used in order to extract the high frequency component from two auxiliary images P1 and P2, other manner may be utilized for extracting the high frequency component from the auxiliary image P1 (and/or P2).

(Variation 4)

The focal planes of the auxiliary images P1 and P2 may be positioned at other than −2f and +2f, respectively. It is possible to extract the high frequency component that is to be added to the objective image P3, if the focal planes of the auxiliary images P1 and P2 are positioned apart from the vertex of the micro-lens 120 at least more than or equal to double of the focal length "f" of the micro-lens 120.

(Variation 5)

In the above mentioned embodiment, the arrangement of each of micro-lenses 120 of the micro-lens array 12 is rectangular, but the present invention is not limited to this arrangement. For example, each of micro-lenses 120 may assume substantially a hexagonal shape and be arranged in a honeycomb pattern.

(Variation 6)

In the first embodiment, an example for the present invention applied to the digital camera is explained, but the present invention is not limited to such an embodiment. For example, the present invention can apply to an image processing apparatus that outputs an objective image with high resolving power when the output signal is input from the image-capturing unit 100. In this case, the image processing apparatus itself may not include the image-capturing unit 100. Moreover, the output signal from the image-capturing unit 100 (the output signal from the image-capturing sensor 13) may be input, for example, by storing it in a portable storage medium such as memory card or via electric communication line and so on.

As long as the features characterizing the present invention are not compromised, the present invention is not limited to the particulars of the embodiments described above and other modes that are conceivable within the technical scope of the present invention will also be within the scope of present invention. The embodiment and the variations described above may be adopted in any combination.

The disclosure of the following priority application is herein incorporated by reference:
Japanese Patent Application No. 2012-41433 filed Feb. 28, 2012

The invention claimed is:

1. An image processing apparatus comprising:
an image generator configured to generate, on a focal plane among a plurality of focal planes along an optical axis of an optical system, an image by output data from a plurality of light receiving units, the plurality of light receiving units being arranged in correspondence with each of a plurality of micro-lenses; and
a processor configured to generate, based upon a first image on a first focal plane and a second image on a second focal plane, a third image on a third focal plane, the third image being an image of the second image but with a resolution enhanced relative to a resolution of the second image and being generated by adding high frequency components generated from the first image to the second image, wherein
the resolution of the second image is lower than the resolution of the first image;
the first focal plane of the first image is positioned a distance from the plurality of micro-lenses that is larger than 2f, where f is a focal length of the plurality of micro-lenses; and
the second focal plane of the second image is positioned a distance from the plurality of micro-lenses that is in a range from −2f to +2f.

2. The image processing apparatus according to claim 1, wherein
the first focal plane is positioned in other than a vicinity of the plurality of micro-lenses, and
the second focal plane and the third focal plane are positioned in the vicinity of the plurality of micro-lenses.

3. The image processing apparatus according to claim 1, wherein the second focal plane and the third focal plane are not positioned apart from a vertex of the plurality of micro-lenses more than or equal to double the focal length of the plurality of micro-lenses.

4. The image processing apparatus according to claim 1, wherein the first focal plane is positioned apart from a vertex of the plurality of micro-lenses more than or equal to double the focal length of the plurality of micro-lenses.

* * * * *